United States Patent
Richard et al.

(10) Patent No.: US 12,435,392 B2
(45) Date of Patent: Oct. 7, 2025

(54) NICKEL-BASED SUPERALLOY FOR MANUFACTURING A PART BY POWDER FORMING

(71) Applicant: SAFRAN, Paris (FR)

(72) Inventors: Sébastien Jean Richard, Moissy-Cramayel (FR); Jérémy Rame, Moissy-Cramayel (FR); Edern Menou, Moissy-Cramayel (FR)

(73) Assignee: SAFRAN, Paris (FR)

( * ) Notice: Subject to any disclaimer, the term of this patent is extended or adjusted under 35 U.S.C. 154(b) by 669 days.

(21) Appl. No.: 17/263,374

(22) PCT Filed: Jul. 24, 2019

(86) PCT No.: PCT/FR2019/051831
§ 371 (c)(1),
(2) Date: Jan. 26, 2021

(87) PCT Pub. No.: WO2020/025880
PCT Pub. Date: Feb. 6, 2020

(65) Prior Publication Data
US 2021/0292873 A1 Sep. 23, 2021

(30) Foreign Application Priority Data

Jul. 31, 2018 (FR) .................................. 1857130

(51) Int. Cl.
| | | |
|---|---|---|
| C22C 19/05 | (2006.01) | |
| B22F 3/24 | (2006.01) | |
| B33Y 70/00 | (2020.01) | |

(52) U.S. Cl.
CPC .............. C22C 19/056 (2013.01); B22F 3/24 (2013.01); B33Y 70/00 (2014.12); *B22F 2003/248* (2013.01); *B22F 2301/15* (2013.01)

(58) Field of Classification Search
CPC .................................................. C22C 19/057
See application file for complete search history.

(56) References Cited

U.S. PATENT DOCUMENTS

| | | | | |
|---|---|---|---|---|
| 3,459,545 | A | * | 8/1969 | Galka ................... C22C 19/056 |
| | | | | 420/448 |
| 3,890,816 | A | | 6/1975 | Allen et al. |
| 3,902,862 | A | * | 9/1975 | Moll ...................... C22C 1/0433 |
| | | | | 419/48 |
| 4,853,044 | A | | 8/1989 | Ford et al. |
| 5,523,170 | A | | 6/1996 | Budinger et al. |
| 2003/0211356 | A1 | * | 11/2003 | Beers ....................... C23C 4/073 |
| | | | | 420/443 |
| 2010/0008778 | A1 | * | 1/2010 | Patrick ...................... F01D 5/26 |
| | | | | 416/144 |

FOREIGN PATENT DOCUMENTS

| | | |
|---|---|---|
| CN | 87102590 A | 10/1987 |
| CN | 87103970 A | 12/1987 |
| CN | 101294251 A | 10/2008 |
| CN | 101935781 A | 1/2011 |
| CN | 104946933 A | 9/2015 |
| EP | 2071128 A2 | 6/2009 |
| GB | 1288189 A | 9/1972 |
| WO | 0222901 A1 | 3/2002 |
| WO | 2017021685 A1 | 2/2017 |
| WO | 2018078269 A1 | 5/2018 |
| WO | WO 2018/092204 A1 | 5/2018 |

OTHER PUBLICATIONS

International Search Report in corresponding Application No. PCT/FR2019/051831, dated Jan. 3, 2020, (2 pages).
French Search Report in corresponding Application No. FR1857130, dated Apr. 10, 2019, (2 pages).
Chinese Office Action in corresponding Chinese Application No. 201980050837.8, dated Apr. 27, 2021 (10 pages).
Chinese Search Report in corresponding Chinese Application No. 201980050837.8, dated Apr. 19, 2021 (3 pages).

* cited by examiner

*Primary Examiner* — Jenny R Wu
(74) *Attorney, Agent, or Firm* — Bookoff McAndrews, PLLC

(57) ABSTRACT

The invention relates to a nickel-based superalloy including, in mass percentages: 5 to 6.5% aluminum, 4.5 to 7% cobalt, 14.5 to 16.5% chromium, 0 to 0.2% hafnium, 0 to 1.5% molybdenum, 2 to 3.5% tantalum, 0 to 2% titanium, 1 to 2.5% tungsten, 0 to 0.08% zirconium, 0 to 0.03% boron, 0 to 0.07% carbon, the remainder formed of nickel and unavoidable impurities.

5 Claims, 1 Drawing Sheet

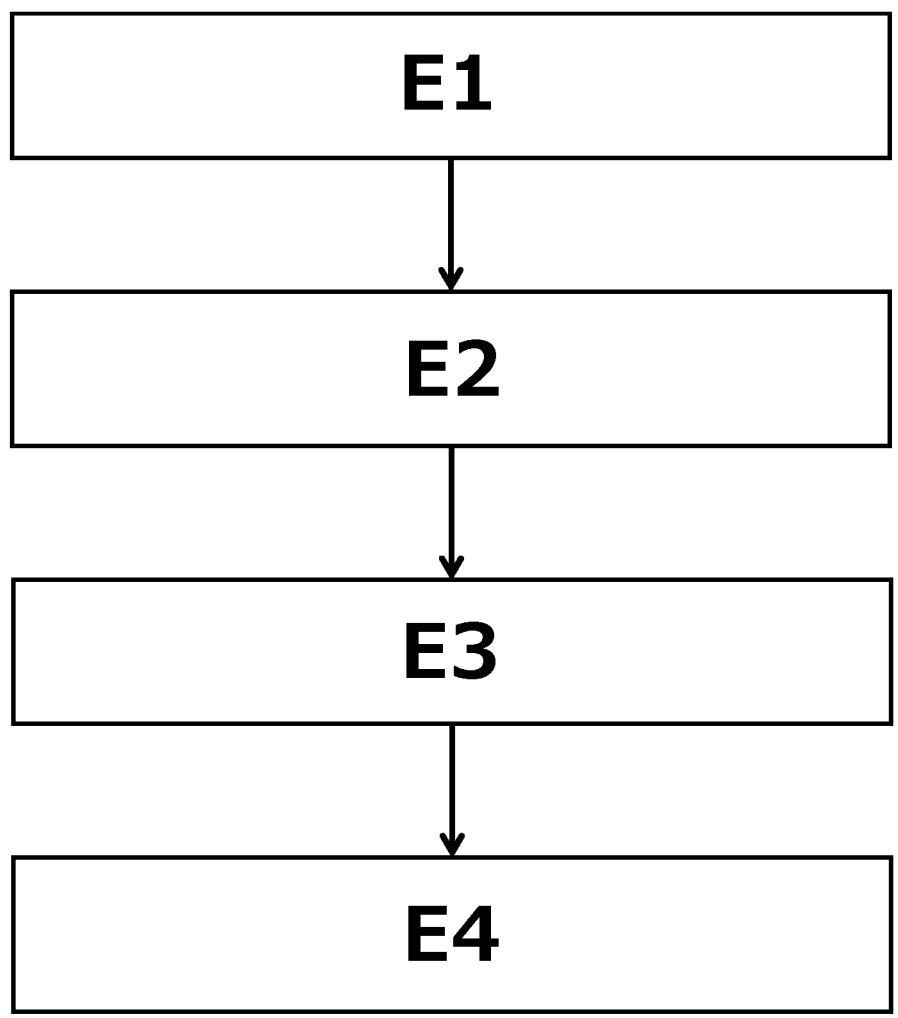

NICKEL-BASED SUPERALLOY FOR MANUFACTURING A PART BY POWDER FORMING

CROSS-REFERENCE TO RELATED APPLICATION(S)

This application is the U.S. national phase entry under 35 U.S.C. § 371 of International Application No. PCT/FR2019/051831, filed on Jul. 24, 2019, which claims priority to French Patent Application No. 1857130, filed on Jul. 31, 2018.

BACKGROUND OF THE INVENTION

The present invention relates to the general field of nickel-based superalloys for gas turbines, in particular for vanes, also called nozzles or rectifiers, moving blades, or ring segments.

Nickel-based superalloys are generally used for the hot parts of gas turbines, i.e., the parts of gas turbines located downstream of the combustion chamber.

The main advantages of nickel-based superalloys are the combination of high creep resistance at high temperatures comprised between 650° C. and 1200° C., as well as oxidation and corrosion resistance.

The resistance to high temperatures is chiefly due to the microstructure of these materials, which is composed of a γ-Ni matrix of face-centered cubic (FCC) crystal structure and ordered hardening precipitates $\gamma'$-$Ni_3Al$ of L12 structure.

A nickel-based superalloy part is generally manufactured by casting, the microstructure of the part being obtained by rigorous control of the casting process parameters, as well as by heat treatments applied successively to the part.

Recently, powder-forming manufacturing processes have been used for the manufacture of nickel-based superalloy parts. As used herein, powder-forming processes refer to manufacturing processes by sintering (also called powder metallurgy processes), or by metal injection molding (MIM process), or by additive manufacturing processes, such as for example a binder jetting process, or for example by a melt deposition process (or fused filament fabrication (FFF) process).

However, the mechanical characteristics of superalloy parts obtained by powder forming may be inferior to the mechanical characteristics of superalloy parts obtained by casting.

Such a decrease in the mechanical characteristics of parts manufactured by powder forming is due to the fact that the temperature ranges used in powder-forming manufacturing processes, as well as the heating and cooling rates, are very different from those of foundry manufacturing processes, which does not allow a part manufactured by powder forming to have the same microstructure as a part manufactured by casting, even though both parts have the same composition.

Rene®77 is a known nickel-based superalloy commonly used in the casting manufacture of gas turbine parts, in particular turbine blades.

For example, a Rene®77 part manufactured by a metal injection molding process (MIM process) has a microstructure with smaller grain sizes than a part manufactured by casting, thus limiting the creep resistance of the part manufactured by the MIM process.

Indeed, the sintering of this superalloy performed during the MIM process takes place in a temperature range where titanium carbides precipitate (between 1200° C. and 1300° C.), which after cooling strongly limit the movement of the grain boundaries by Zener pinning, and thus limits the generation of a coarse-grained microstructure.

The document WO 02/22901, which describes a nickel-based superalloy, is known.

OBJECT AND SUMMARY OF THE INVENTION

The present invention thus aims to propose nickel-based superalloys compositions which are suitable for the manufacture of a part by forming a nickel-based superalloy powder, so as to improve the mechanical characteristics of the part, and in particular the creep resistance.

In particular, the aim of the invention is to maintain microstructural stability in the volume of the superalloy by ensuring low sensitivity to the formation of topologically compact phases TCP (u or o phases rich in chromium, molybdenum, and tungsten).

The invention also aims to give the superalloy a $\gamma'$ phase content that is similar to the state-of-the-art superalloys used for casting. The invention also aims to provide an alloy whose density is not too high.

According to a first aspect, the invention proposes a nickel-based superalloy comprising, in mass percentages:

5 to 6.5% aluminum,
4.5 to 7% cobalt,
14.5 to 16.5% chromium,
0 to 0.2% hafnium,
0 to 1.5% molybdenum,
2 to 3.5% tantalum,
0 to 2% titanium,
1 to 2.5% tungsten,
0 to 0.08% zirconium,
0 to 0.03% boron,
0 to 0.07% carbon, the remainder consisting of nickel and unavoidable impurities.

A nickel-based alloy is defined as an alloy in which the mass percentage of nickel is predominant.

Unavoidable impurities are defined as those elements that are not intentionally added to the composition and are brought with other elements. Among unavoidable impurities, particular mention may be made of silicon (Si).

The superalloy according to the invention makes it possible to manufacture a part by powder forming with a microstructure that is comparable to the microstructure of a part manufactured by casting with conventional alloys that are suitable for casting.

The superalloy according to the invention makes it possible in particular to limit, or even avoid, during sintering, the formation of carbides, or other compounds, which tend to limit the movement of the grain boundaries, and thus limit the size of the grains.

According to a possible variant, the superalloy may comprise, in mass percentages:

5 to 6.5% aluminum,
4.5 to 7% cobalt,
14.5 to 16.5% chromium,
0 to 0.2% hafnium,
0 to 1.5% molybdenum,
2 to 3.5% tantalum,
0.5 to 2% titanium,
1 to 2.5% tungsten,
0 to 0.08% zirconium,
0 to 0.03% boron,
0 to 0.07% carbon, the remainder consisting of nickel and unavoidable impurities.

Furthermore, the superalloy may comprise, in mass percentages:
5.6 to 6% aluminum,
5.2 to 6.2% cobalt,
15.4 to 16% chromium,
0 to 0.15% hafnium,
0.5 to 0.9% molybdenum,
2.5 to 2.9% tantalum,
0 to 1.5% titanium,
1.6 to 2% tungsten,
0 to 0.08% zirconium,
0 to 0.03% boron,
0 to 0.07% carbon,
the remainder consisting of nickel and unavoidable impurities.

The superalloy may also comprise, in mass percentages:
5.6 to 6% aluminum,
5.2 to 6.2% cobalt,
15.4 to 16% chromium,
0 to 0.15% hafnium,
0.5 to 0.9% molybdenum,
2.5 to 2.9% tantalum,
0.5 to 1.5% titanium,
1.6 to 2% tungsten,
0 to 0.08% zirconium,
0 to 0.03% boron,
0 to 0.07% carbon,
the remainder consisting of nickel and unavoidable impurities.

According to a possible variant, the superalloy may also comprise, in mass percentages:
5.6 to 6% aluminum,
5.2 to 6.2% cobalt,
15.4 to 16% chromium,
0 to 0.15% hafnium,
0.5 to 0.9% molybdenum,
2.5 to 2.9% tantalum,
1 to 1.5% titanium,
1.6 to 2% tungsten,
0 to 0.08% zirconium,
0 to 0.03% boron,
0 to 0.07% carbon,
the remainder consisting of nickel and unavoidable impurities.

The superalloy may further comprise, in mass percentages:
5.6 to 6% aluminum,
5.2 to 6.2% cobalt,
15.4 to 16% chromium,
0 to 0.15% hafnium,
0.5 to 0.9% molybdenum,
2.5 to 2.9% tantalum,
0 to 1.5% titanium,
1.6 to 2% tungsten,
0.04 to 0.08% zirconium,
0 to 0.03% boron,
0 to 0.07% carbon,
the remainder consisting of nickel and unavoidable impurities.

According to a possible variant, the superalloy may comprise, in mass percentages:
5.6 to 6% aluminum,
5.2 to 6.2% cobalt,
15.4 to 16% chromium,
0.1 to 0.15% hafnium,
0.5 to 0.9% molybdenum,
2.5 to 2.9% tantalum,
0 to 1.5% titanium,
1.6 to 2% tungsten,
0 to 0.08% zirconium,
0 to 0.03% boron,
0 to 0.07% carbon,
the remainder consisting of nickel and unavoidable impurities.

According to another possible variant, the superalloy may comprise, in mass percentages:
5.6 to 6% aluminum,
5.2 to 6.2% cobalt,
15.4 to 16% chromium,
0.1 to 0.15% hafnium,
0.5 to 0.9% molybdenum,
2.5 to 2.9% tantalum,
0 to 1.5% titanium,
1.6 to 2% tungsten,
0.04 to 0.08% zirconium,
0 to 0.03% boron,
0 to 0.07% carbon,
the remainder consisting of nickel and unavoidable impurities.

According to another possible variant, the superalloy may comprise, in mass percentages:
5.6 to 6% aluminum,
5.2 to 6.2% cobalt,
15.4 to 16% chromium,
0.1 to 0.15% hafnium,
0.5 to 0.9% molybdenum,
2.5 to 2.9% tantalum,
0.5 to 1.5% titanium,
1.6 to 2% tungsten,
0 to 0.08% zirconium,
0 to 0.03% boron,
0 to 0.07% carbon,
the remainder consisting of nickel and unavoidable impurities.

According to another possible variant, the superalloy may comprise, in mass percentages:
5.6 to 6% aluminum,
5.2 to 6.2% cobalt,
15.4 to 16% chromium,
0 to 0.15% hafnium,
0.5 to 0.9% molybdenum,
2.5 to 2.9% tantalum,
0.5 to 1.5% titanium,
1.6 to 2% tungsten,
0.04 to 0.08% zirconium,
0 to 0.03% boron,
0 to 0.07% carbon,
the remainder consisting of nickel and unavoidable impurities.

According to a possible variant, the superalloy may comprise, in mass percentages:
5.6 to 6% aluminum,
5.2 to 6.2% cobalt,
15.4 to 16% chromium,
0.1 to 0.15% hafnium,
0.5 to 0.9% molybdenum,
2.5 to 2.9% tantalum,
0.5 to 1.5% titanium,
1.6 to 2% tungsten,
0.04 to 0.08% zirconium,
0 to 0.03% boron,
0 to 0.07% carbon, the remainder consisting of nickel and unavoidable impurities.

According to a possible variant, the superalloy may comprise, in mass percentages:
- 5.6 to 6% aluminum,
- 5.2 to 6.2% cobalt,
- 15.4 to 16% chromium,
- 0.1 to 0.15% hafnium,
- 0.5 to 0.9% molybdenum,
- 2.5 to 2.9% tantalum,
- 1 to 1.5% titanium,
- 1.6 to 2% tungsten,
- 0.04 to 0.08% zirconium,
- 0 to 0.03% boron,
- 0 to 0.07% carbon, the remainder consisting of nickel and unavoidable impurities.

According to a second aspect, the invention proposes a nickel-based superalloy gas turbine part according to any one of the preceding characteristics.

The part may be a component of a turbine of an aircraft gas turbine engine, such as a high-pressure turbine or a low-pressure turbine, or a compressor component, and in particular a high-pressure compressor component.

According to an additional characteristic, the turbine or compressor part can be a blade, said blade being able a moving blade or a vane, or a ring sector.

According to a third aspect, the invention proposes a process for manufacturing a gas turbine part comprising the following steps:
- manufacture of a nickel-based superalloy powder according to any one of the above characteristics;
- production of the part by forming the powder.

The process for forming the nickel-based superalloy powder can be carried out by sintering said powder, or by additive manufacture from said powder, or by metal injection molding (MIM process) from said powder.

According to an additional characteristic, the process comprises a re-solution heat treatment step which is followed by a γ' phase precipitation heat treatment step.

BRIEF DESCRIPTION OF THE DRAWINGS

Other characteristics and advantages of the present invention will emerge from the description made below, with reference to the appended drawing which illustrates an example embodiment free of any limiting character.

FIG. 1 schematically represents the steps of a process for manufacturing a gas turbine part according to a possible variant of the invention.

DETAILED DESCRIPTION OF THE INVENTION

The superalloy according to the invention comprises a nickel base with which major addition elements are associated.

Major addition elements include: cobalt Co, chromium Cr, molybdenum Mo, tungsten W, aluminum Al, and tantalum Ta. Major addition elements may also include titanium Ti.

The superalloy may also include minor additions, which are addition elements whose maximum percentage in the alloy does not exceed 1% by mass percentage.

Minor addition elements include: hafnium Hf, carbon C, boron B, and zirconium Zr.

The nickel-based superalloy comprises, in mass percentages 5 to 6.5% aluminum, 4.5 to 7% cobalt, 14.5 to 16.5% chromium, 0 to 0.2% hafnium, 0 to 1.5% molybdenum, 2 to 3.5% tantalum, 0 to 2% titanium, 1 to 2.5% tungsten, 0 to 0.08% zirconium, 0 to 0.03% boron, 0 to 0.07% carbon, the remainder consisting of nickel and unavoidable impurities.

Such a superalloy composition improves the high-temperature mechanical resistance properties of the manufactured parts by forming a powder consisting of said superalloy.

Such an improvement in mechanical properties is achieved by producing a microstructure within the powder-formed superalloy part that tends to resemble the microstructure of state-of-the-art superalloy parts that are made by casting.

The superalloy according to the invention is adapted to the temperatures used during powder forming manufacturing which are lower than the temperatures used in casting processes.

Tungsten, chromium, and cobalt participate chiefly in the hardening of the austenitic matrix of face centered cubic (FCC) crystal structured, also called γ (gamma) matrix. This hardening is obtained by substitution of nickel by tungsten, chromium, and cobalt.

In addition, preferentially, the superalloy may include molybdenum, as molybdenum also participates chiefly in the hardening of the γ matrix by substituting nickel.

Aluminum and tantalum promote the precipitation of the $Ni_3$ hardening phase (Al, Ta) of ordered cubic structure L12, also known as the γ' (gamma') phase.

In addition, preferentially, the superalloy may include titanium, as titanium also promotes the precipitation of the $Ni_3$ hardening phase (Al, Ta, Ti), the γ' phase.

Furthermore, the refractory elements, namely molybdenum, tungsten, and tantalum, also slow down the mechanisms controlled by diffusion, thus improving the creep and oxidation resistance of the superalloy.

Moreover, chromium and aluminum improve the resistance to oxidation and corrosion at high temperatures of the superalloy, in particular around 900° C. for corrosion, and around 1100° C. for oxidation.

The addition of chromium and cobalt also reduces the γ' solvus temperature of the superalloy.

In addition, cobalt strengthens the γ matrix, as well as reducing the sensitivity to precipitation of topologically compact phases TCP and the formation of secondary reaction zones SRZ. However, cobalt tends to decrease the γ' solvus temperature.

Advantageously, the superalloy may also comprise hafnium to improve hot oxidation resistance by increasing the adhesion of the alumina $Al_2O_3$ layer that forms on the superalloy at high temperature in an oxidizing environment.

In addition, the addition of carbon, boron and zirconium strengthens the resistance of the grain boundaries, thus improving the corrosion resistance of the part made with the superalloy.

Preferentially, the nickel-based superalloy comprises, in mass percentages, 5 to 6.5% aluminum, 4.5 to 7% cobalt, 14.5 to 16.5% chromium, 0 to 0.2% hafnium, 0 to 1.5% molybdenum, 2 to 3.5% tantalum, 0.5 to 2% titanium, 1 to 2.5% tungsten, 0 to 0.08% zirconium, 0 to 0.03% boron, 0 to 0.07% carbon, the remainder consisting of nickel and unavoidable impurities.

A titanium content comprised between 0.5 and 2%, in mass percentages, improves creep resistance.

The nickel-based superalloy may also comprise, in mass percentages, 5.6 to 6% aluminum, 5.2 to 6.2% cobalt, 15.4 to 16% chromium, 0 to 0.15% hafnium, 0.5 to 0.9% molybdenum, 2.5 to 2.9% tantalum, 0 to 1.5% titanium, 1.6 to 2% tungsten, 0 to 0.08% zirconium, 0 to 0.03% boron, 0 to 0.07% carbon, the remainder consisting of nickel and unavoidable impurities.

Preferentially, the superalloy comprises, in mass percentages, 5.6 to 6% aluminum, 5.2 to 6.2% cobalt, 15.4 to 16% chromium, 0 to 0.15% hafnium, 0.5 to 0.9% molybdenum, 2.5 to 2.9% tantalum, 0.5 to 1.5% titanium, 1.6 to 2% tungsten, 0 to 0.08% zirconium, 0 to 0.03% boron, 0 to 0.07% carbon, the remainder consisting of nickel and unavoidable impurities.

A titanium content comprised between 0.5 and 1.5%, in mass percentages, further improves creep resistance.

Even more preferentially, the superalloy comprises, in mass percentages, 5.6 to 6% aluminum, 5.2 to 6.2% cobalt, 15.4 to 16% chromium, 0 to 0.15% hafnium, 0.5 to 0.9% molybdenum, 2.5 to 2.9% tantalum, 1 to 1.5% titanium, 1.6 to 2% tungsten, 0 to 0.08% zirconium, 0 to 0.03% boron, 0 to 0.07% carbon, the remainder consisting of nickel and unavoidable impurities.

A titanium content comprised between 1 and 1.5%, in mass percentages, further improves creep strength.

The superalloy may also comprise, in mass percentages, 5.6 to 6% aluminum, 5.2 to 6.2% cobalt, 15.4 to 16% chromium, 0 to 0.15% hafnium, 0.5 to 0.9% molybdenum, 2.5 to 2.9% tantalum, 0 to 1.5% titanium, 1.6 to 2% tungsten, 0.04 to 0.08% zirconium, 0 to 0.03% boron, 0 to 0.07% carbon, the remainder consisting of nickel and unavoidable impurities.

A zirconium content of 0.04 to 0.08%, and maximum levels of 0.03% boron and 0.07% carbon, in mass percentages, improves corrosion resistance.

The superalloy may also comprise, in mass percentages, 5.6 to 6% aluminum, 5.2 to 6.2% cobalt, 15.4 to 16% chromium, 0.1 to 0.15% hafnium, 0.5 to 0.9% molybdenum, 2.5 to 2.9% tantalum, 0 to 1.5% titanium, 1.6 to 2% tungsten, 0 to 0.08% zirconium, 0 to 0.03% boron, 0 to 0.07% carbon, the remainder consisting of nickel and unavoidable impurities.

A hafnium content comprised between 0.1 and 0.15% hafnium improves the mechanical characteristics of the superalloy.

Preferentially, the superalloy comprises, in mass percentages, 5.6 to 6% aluminum, 5.2 to 6.2% cobalt, 15.4 to 16% chromium, 0.1 to 0.15% hafnium, 0.5 to 0.9% molybdenum, 2.5 to 2.9% tantalum, 0 to 1.5% titanium, 1.6 to 2% tungsten, 0.04 to 0.08% zirconium, 0 to 0.03% boron, 0 to 0.07% carbon, the remainder consisting of nickel and unavoidable impurities.

The superalloy may also comprise, in mass percentages, 5.6 to 6% aluminum, 5.2 to 6.2% cobalt, 15.4 to 16% chromium, 0.1 to 0.15% hafnium, 0.5 to 0.9% molybdenum, 2.5 to 2.9% tantalum, 0.5 to 1.5% titanium, 1.6 to 2% tungsten, 0 to 0.08% zirconium, 0 to 0.03% boron, 0 to 0.07% carbon, the remainder consisting of nickel and unavoidable impurities.

The superalloy may also comprise, in mass percentages, 5.6 to 6% aluminum, 5.2 to 6.2% cobalt, 15.4 to 16% chromium, 0 to 0.15% hafnium, 0.5 to 0.9% molybdenum, 2.5 to 2.9% tantalum, 0.5 to 1.5% titanium, 1.6 to 2% tungsten, 0.04 to 0.08% zirconium, 0 to 0.03% boron, 0 to 0.07% carbon, the remainder consisting of nickel and unavoidable impurities.

Preferentially, the superalloy comprises, in mass percentages, 5.6 to 6% aluminum, 5.2 to 6.2% cobalt, 15.4 to 16% chromium, 0.1 to 0.15% hafnium, 0.5 to 0.9% molybdenum, 2.5 to 2.9% tantalum, 0.5 to 1.5% titanium, 1.6 to 2% tungsten, 0.04 to 0.08% zirconium, 0 to 0.03% boron, 0 to 0.07% carbon, the remainder consisting of nickel and unavoidable impurities.

Even more preferentially, the superalloy comprises, in mass percentages, 5.6 to 6% aluminum, 5.2 to 6.2% cobalt, 15.4 to 16% chromium, 0.1 to 0.15% hafnium, 0.5 to 0.9% molybdenum, 2.5 to 2.9% tantalum, 1 to 1.5% titanium, 1.6 to 2% tungsten, 0.04 to 0.08% zirconium, 0 to 0.03% boron, 0 to 0.07% carbon, the remainder consisting of nickel and unavoidable impurities.

The superalloy makes it possible to manufacture gas turbine parts with good mechanical resistance at high temperatures.

As shown in FIG. 1, the process for manufacturing a gas turbine part comprises the following steps:

S1: manufacture of a nickel-based superalloy powder as described above;

S2: production of the part by forming the powder.

Step S1 of manufacturing the nickel superalloy powder is carried out by atomization of a melt prepared beforehand in order to have the desired composition. The atomization can be carried out with an inert gas, such as for example dinitrogen, helium, or argon.

Step S2 of producing the part by forming the powder obtained during step S1 can be performed by sintering (also called powder metallurgy process) or additive manufacturing, or by metal injection molding (MIM process).

Manufacturing by sintering the powder is carried out by filling a mold to give the powder the shape of the part to be produced, then compressing the powder and heating it to bind the grains of the powder by diffusion. The cohesion of the part is obtained by the phenomenon of diffusion, without fusion of the powder. The sintering temperature can be comprised between 1220° C. and 1320° C.

Additive manufacture from the superalloy powder can be carried out by binder jetting. To that end, a thin layer of powder is deposited on a tray. A binder is then sprayed onto the powder layer according to the shape of the part to be manufactured, in order to bind different grains of the powder together and thus produce a first elemental portion of the part. Once the first elemental portion of the part is manufactured, the tray is lowered and a new layer of powder is deposited over the first elemental portion of the part being manufactured. Here again, once the powder layer has been applied, the binder is sprayed to make a second elemental portion of the part. These operations are then repeated to produce the entire part. The binder can then be removed, and the part can be sintered, for example at a temperature comprised between 1220° C. and 1320° C.

According to another possible variant, the additive manufacturing of the part can be performed by a melt deposition process (or fused filament fabrication (FFF) process). To that end, the superalloy powder is mixed with a plastic binder, and then shaped to form a filament. The filament formed by mixing the metal and the plastic binder is then melted in a controlled manner and the melt is deposited in such a way as to give its shape to the part to be manufactured. Once the part has been formed by depositing material from the filament, the plastic binder is removed, for example by heating, in order to obtain a part consisting solely of the superalloy. Once the plastic binder is removed, the component is sintered, with a sintering temperature comprised between 1220° C. and 1320° C.

According to still another possible variant, the additive manufacturing of the part is performed by selective laser melting (SLM). To that end, a thin layer of superalloy powder is deposited on a tray. A laser beam then selectively melts the powder to form a first elemental portion of the part, the atmosphere being controlled so as not to pollute the superalloy. Once the first elemental portion has been fabricated, the platen is lowered and a new powder layer is deposited over the first elemental portion of the part. This new powder layer is then selectively melted by the laser in order to fabricate a second elemental portion of the part. These operations are then repeated in order to produce the entire part.

According to still another possible variant, the additive manufacturing of the part is performed by electron beam melting (EBM), which is a process similar to selective laser melting, where the powder is melted by an electron beam instead of the laser, the powder being under vacuum.

Step S2 of production of the part by forming the powder can be carried out by metal injection molding (MIM). To that end, the superalloy powder is mixed with a plastic binder. The mixture is then injected to give the part its shape. Once shaped, the binder is removed, for example by heating, in order to obtain a part consisting solely of the nickel-based superalloy. Once the plastic binder has been removed, the part is sintered, the sintering temperature being for example comprised between 1220° C. and 1320° C.

Furthermore, as shown in FIG. 1, the manufacturing process may include a re-solution heat treatment step S3 followed by a γ' phase precipitation heat treatment step S4.

The re-solution heat treatment step S3 is performed by heating the part at a temperature and for a period of time that is suitable to cause the dissolution of the γ' precipitates formed during the manufacture of the part. The temperature of the re-solution heat treatment is lower than the solidus temperature to avoid local melting of the γ matrix.

The re-solution heat treatment step S3 can be performed by heating the part to a temperature comprised between 1100° C. and 1300° C., typically 1200° C., for a period of time comprised between 1 h and 5 h, typically 3 h.

Furthermore, this re-solution heat treatment step S3 enlarges the grains of the microstructure of the part.

The γ' phase precipitation heat treatment step S4 is carried out by one or more agings that allow the re-precipitation of the γ' phase in the desired form.

The S4 precipitation heat treatment step of the γ' phase can for example be carried out by a first aging at a temperature comprised between 800° C. and 900° C., typically 850° C., which is followed by a second aging at a temperature comprised between 700° C. and 800° C., typically 750° C. The first aging causes the precipitation of large γ' phase precipitates, and the second aging causes the precipitation of smaller Y' phase precipitates.

The manufactured parts can have an equiaxed crystal structure, i.e., the grain size of the crystal structure is substantially equivalent in all directions. This equiaxed structure is achieved by sintering the powder, as sintering does not orient the grains.

However, the invention is not limited to the manufacture of parts with an equiaxed crystal structure. For example, the use of the variant of manufacture of the part by selective laser melting (SLM process), or electron beam melting (EBM process) can make it possible to manufacture parts with oriented grains.

The superalloy according to the invention is suitable for the manufacture of blades for a gas turbine. The blades may be the blades of a compressor, and preferentially of a high-pressure compressor which has a higher working temperature than a low-pressure compressor, or the blades may be turbine blades.

The invention claimed is:

1. A nickel-based superalloy consisting of, in mass percentages:
   5 to 6.5% aluminum,
   5.2 to 6.2% cobalt,
   14.5 to 16.5% chromium,
   0 to 0.2% hafnium,
   0 to 1.5% molybdenum,
   2 to 3.5% tantalum,
   0 to 2% titanium,
   1 to 2.5% tungsten,
   0 to 0.08% zirconium,
   0 to 0.03% boron,
   0 to 0.07% carbon,
   the remainder consisting of nickel and unavoidable impurities.

2. The superalloy as claimed in claim 1, wherein said superalloy consists of, in mass percentages:
   5.6 to 6% aluminum,
   5.2 to 6.2% cobalt,
   15.4 to 16% chromium,
   0 to 0.15% hafnium,
   0.5 to 0.9% molybdenum,
   2.5 to 2.9% tantalum,
   0 to 1.5% titanium,
   1.6 to 2% tungsten,
   0 to 0.08% zirconium,
   0 to 0.03% boron,
   0 to 0.07% carbon,
   the remainder consisting of nickel and unavoidable impurities.

3. A gas turbine part made of the nickel-based superalloy as claimed in claim 1.

4. A process for manufacturing a gas turbine part comprising the following steps:
   (S1): manufacture of the nickel-based superalloy as claimed in claim 1, wherein the nickel-based superalloy is manufactured as a powder;
   (S2): production of the gas turbine part by forming the powder.

5. The process as claimed in claim 4, wherein said process comprises a re-solution heat treatment step (S3) which is followed by a γ' phase precipitation heat treatment step (S4).

* * * * *